United States Patent
Al Bahrani et al.

(10) Patent No.: US 12,547,988 B2
(45) Date of Patent: Feb. 10, 2026

(54) DIGITAL GREASING INTELLIGENT TOOL

(71) Applicant: SAUDI ARABIAN OIL COMPANY, Dhahran (SA)

(72) Inventors: Jafar Ibrahim Al Bahrani, Al-Hofuf (SA); Emad Abbad M. Alabbad, Dammam (SA); Jamie Cochran, Aberdeenshire (GB); Rae Younger, Aberdeenshire (GB)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 411 days.

(21) Appl. No.: 18/300,235

(22) Filed: Apr. 13, 2023

(65) Prior Publication Data

US 2024/0346457 A1    Oct. 17, 2024

(51) Int. Cl.
*G06Q 10/20*     (2023.01)
*G06K 7/10*     (2006.01)

(52) U.S. Cl.
CPC ......... *G06Q 10/20* (2013.01); *G06K 7/10366* (2013.01)

(58) Field of Classification Search
CPC .......................... G06Q 10/20; G06K 7/10366
USPC ..................................................... 702/184
See application file for complete search history.

(56) References Cited

U.S. PATENT DOCUMENTS

| | | | |
|---|---|---|---|
| 8,560,037 B2 | 10/2013 | Goode, Jr. et al. | |
| 8,955,592 B2 * | 2/2015 | Organ | F16N 11/10 |
| | | | 166/335 |
| 10,100,978 B2 | 10/2018 | Gouge | |
| 10,724,682 B2 | 7/2020 | Beason et al. | |
| 10,816,137 B2 | 10/2020 | Herman et al. | |
| 11,191,463 B2 | 12/2021 | Scott et al. | |
| 11,480,028 B2 | 10/2022 | Beason et al. | |
| 2002/0065454 A1 | 5/2002 | Lebel et al. | |
| 2019/0380645 A1 | 12/2019 | Kopperschmidt et al. | |
| 2020/0347990 A1 * | 11/2020 | McKim | F16N 25/00 |

FOREIGN PATENT DOCUMENTS

| | | |
|---|---|---|
| CN | 107609669 A | 1/2018 |
| CN | 110985866 A | 4/2020 |

\* cited by examiner

*Primary Examiner* — John H Le
(74) *Attorney, Agent, or Firm* — Osha Bergman Watanabe & Burton LLP

(57) ABSTRACT

A method and a system to perform a wellhead maintenance process are disclosed. The wellhead maintenance process includes digitizing data records of wellhead valve greasing operations, automatic well and wellhead valve data recognition and verification, automatic generation of greasing operation volume recommendations, and generating advanced greasing operation analytics. A portable microcontroller device is used for geolocating and timestamping the digital maintenance records of the wellhead valve greasing operation to improve operation efficiency and automation as well as compliance audit verification.

20 Claims, 10 Drawing Sheets

DIGITAL GREASING INTELLIGENT TOOL

BACKGROUND

Integrity testing and greasing of wellhead valves is an integral part of the well integrity surveillance program which is carried out on oil, water, and gas wells that are under operation, suspended from operation, or suspended from exploration. The well integrity surveillance program (i.e., survey) assures the integrity of the wellhead valves, such as crown valve, master valve, wing valve, kill valve, among others. In particular, wellhead valves integrity testing is performed to guarantee the ability to control the well when required. This survey ensures that the valves are capable of isolating and holding the fluid flow and pressure at all times. Wellhead valves are critical assets that need proper maintenance to function as designed. The frequent maintenance of wellhead valves reduces friction, corrosion-induced damage, debris accumulation, sludge, etc., by minimizing direct contact of valve components with the flowing fluid. Proper lubrication improves the performance and the life of the valve. Lubrication is also used as a temporary remedial action to prevent minor valve leaks. All valves that are flushed and lubricated properly after passing the wellhead valve integrity testing.

Greasing of wellhead valves is part of the wellhead maintenance process where every single stage of this greasing operation should be conducted correctly. Verification of quality of the maintenance process is challenging when a large number of wells scatter over a large geographic area. In addition, there are a variety of valves suppliers and valve sizes which require different greasing volumes to maintain the valve integrity. The quality of such greasing operations is highly dependent on the operator performing the greasing operation correctly. Greasing operation data reporting is often done manually which impacts data accuracy and is prone to human errors. To check quality assurance/quality control (QA/QC) compliance of the wellhead maintenance process and standards, random checks and audits may be used, however these checks are considered a weak point in controlling the wellhead maintenance process due to the remote nature of the maintenance operations (e.g., greasing operation) and the common lack of adequate measurement during the operations.

SUMMARY

In general, in one aspect, the invention relates to a method to perform a maintenance operation of a field. The method includes initiating, using a data logger and control panel device, a valve greasing operation at a wellsite of a plurality of wellsites of the field, wherein said initializing comprises obtaining an operator identifier of a greasing operator, a wellhead identifier of a wellhead at the wellsite, a grease gun identifier of a grease gun used by the greasing operator, and a valve identifier of a valve of the wellhead, injecting, by the operator using the grease gun, grease into the valve for lubrication, collecting, during said injecting and by the data logger and control panel device, sensor data from a pressure sensor and a flow meter, and generating, based on the collected sensor data and by the data logger and control panel device, an indication of grease acceptance, and stopping, in response to the indication of grease acceptance, the injection of the grease into the valve.

In general, in one aspect, the invention relates to a data logger and control panel device for performing a maintenance operation at a wellsite of a field. The data logger and control panel device includes a radio frequency identification (RFID) reader configured to scan a plurality of RFID tags of a greasing operator performing a greasing operation at the wellsite to generate an operator identifier, scan a second RFID tag of a grease gun used by the greasing operator to generate a grease gun identifier, and scan a third RFID tag of a valve of a wellhead at the wellsite to generate a valve identifier, wherein the grease gun is connected to the valve via a greasing adapter, a global positioning system (GPS) receiver configured to obtain a GPS location of the wellsite, a pressure sensor connector for connecting to a pressure sensor of the greasing adapter, a flow meter connector for connecting to a flow meter of the greasing adapter, a computer core module configured to collect, during injection of grease from the grease gun into the valve for lubrication, sensor data from the pressure sensor and the flow meter, and generate, based on the collected sensor data, an indication of grease acceptance, and a display configured to display the indication of grease acceptance, wherein said injection of grease into the valve for lubrication is stopped in response to the indication of grease acceptance.

data logger and control panel device digital greasing intelligent tool (DGIT) for performing a maintenance operation at a wellsite of a field. The DGIT includes a data logger and control panel device, comprising a radio frequency identification (RFID) reader configured to scan a first RFID tag of a greasing operator performing a greasing operation at the wellsite to generate an operator identifier, scan a second RFID tag of a grease gun used by the greasing operator to generate a grease gun identifier, and scan a third RFID tag of a valve of a wellhead at the wellsite to generate a valve identifier, a global positioning system (GPS) receiver configured to obtain a GPS location of the wellsite, a pressure sensor connector for connecting to a pressure sensor of a greasing adapter, a flow meter connector for connecting to a flow meter of the greasing adapter, a computer core module configured to collect, during injecting grease from the grease gun into the valve for lubrication, sensor data from the pressure sensor and the flow meter, and generate, based on the collected sensor data, an indication of grease acceptance, and a display configured to display the indication of grease acceptance, and a greasing adapter adapted to connect the grease gun and the valve, the greasing adapter comprising the pressure sensor and the flow meter, wherein said injecting grease into the valve for lubrication is stopped in response to the indication of grease acceptance.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (for example, first, second, third) may be used as an adjective for an element (that is, any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure are directed to a method and a system to perform a wellhead maintenance process. The wellhead maintenance process includes digitizing data records of wellhead valve greasing operations, automatic well and wellhead valve data recognition and verification, automatic generation of greasing operation volume recommendations, and generating advanced greasing operation analytics. In one or more embodiments, a portable microcontroller device is used for geolocating and time-stamping the digital maintenance records of the wellhead valve greasing operation to improve operation efficiency and automation as well as compliance audit verification.

Figure 1A:
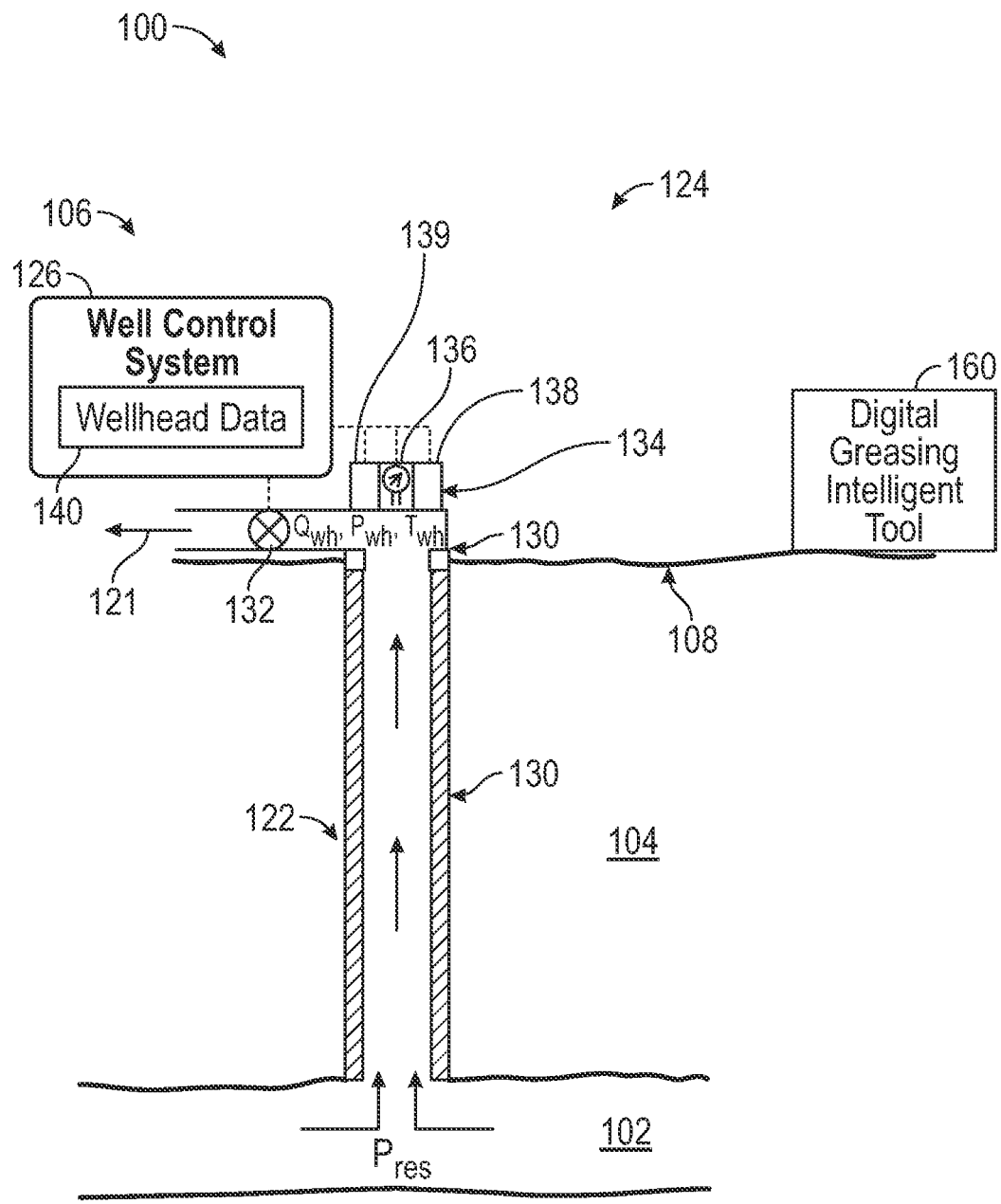
FIGS. 1A-1F show a system in accordance with one or more embodiments.

FIG. 1A shows a schematic diagram in accordance with one or more embodiments. More specifically, FIG. 1A illustrates a well environment (100) that includes a hydrocarbon reservoir ("reservoir") (102) located in a subsurface hydrocarbon-bearing formation ("formation") (104) and a well system (106). The area where the reservoir (102) extends is referred to as a field, e.g., an oil field or a gas field. The hydrocarbon-bearing formation (104) may include a porous or fractured rock formation that resides underground, beneath the Earth's surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock (referred to as formation layers) having varying characteristics, such as varying degrees of permeability, porosity, capillary pressure, and resistivity. In one or more embodiments of the invention, the well system (106) and associated well may be performing production operation, suspended from operation, or suspended from exploration. In the case of the well system (106) being operated as a production well, the well system (106) may facilitate the extraction of hydrocarbons (or "production") from the reservoir (102).

In some embodiments, the well system (106) includes a wellbore (120), a well sub-surface system (122), a well surface system (124), and a well control system ("control system") (126). The area where the well system is located is referred to as the wellsite. The control system (126) may control various operations of the well system (106), such as well production operations, well completion operations, well maintenance operations, and reservoir monitoring, assessment and development operations that are collectively referred to as the well system operations. In some embodiments, the control system (126) includes a computer system that is the same as or similar to that of the computer system (400) described below in FIG. 4 and the accompanying description.

The wellbore (120) may include a bored hole that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "down-hole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) into the hydrocarbon-bearing formation (104) or the reservoir (102) during monitoring operations (e.g., during in situ logging operations).

In some embodiments, during operation of the well system (106), the control system (126) collects and records wellhead data (140) for the well system (106). The wellhead data (140) may include, for example, a record of measurements of wellhead pressure ($P_{wh}$) (e.g., including flowing wellhead pressure), wellhead temperature ($T_{wh}$) (e.g., including flowing wellhead temperature), wellhead production rate ($Q_{wh}$) over some or all of the life of the well system (106), and water cut data. In some embodiments, the measurements are recorded in real-time, and are available for review or use within seconds, minutes or hours of the condition being sensed (e.g., the measurements are available within 1 hour of the condition being sensed). In such an embodiment, the wellhead data (140) may be referred to as "real-time" wellhead data (140). Real-time wellhead data (140) may enable an operator of the well system (106) to assess a relatively current state of the well system (106), and make real-time decisions regarding development of the well system (106) and the reservoir (102), such as on-demand adjustments in regulation of production flow from the well.

In some embodiments, the well sub-surface system (122) includes casing installed in the wellbore (120). For example, the wellbore (120) may have a cased portion and an uncased (or "open-hole") portion. The cased portion may include a portion of the wellbore having casing (e.g., casing pipe and casing cement) disposed therein. The uncased portion may include a portion of the wellbore not having casing disposed therein. In some embodiments, the casing includes an annular casing that lines the wall of the wellbore (120) to define a central passage that provides a conduit for the transport of tools and substances through the wellbore (120). For example, the central passage may provide a conduit for lowering logging tools into the wellbore (120), a conduit for the flow of production (121) (e.g., oil and gas) from the reservoir (102) to the surface (108), or a conduit for the flow of injection substances (e.g., water) from the surface (108) into the hydrocarbon-bearing formation (104). In some embodiments, the well sub-surface system (122) includes production tubing installed in the wellbore (120). The production tubing may provide a conduit for the transport of tools and substances through the wellbore (120). The production tubing may, for example, be disposed inside casing. In such an embodiment, the production tubing may provide a conduit for some or all of the production (121) (e.g., oil and gas) passing through the wellbore (120) and the casing.

In some embodiments, the well surface system (124) includes a wellhead (130). The wellhead (130) may include a rigid structure (referred to as the Christmas tree) installed at the "up-hole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more wellhead valves (132) that are operable to control the flow of production (121). For example, a wellhead valve (132) may be fully opened to enable unrestricted flow of production (121) from the wellbore (120), the wellhead valve (132) may be partially opened to partially restrict (or "throttle") the flow of production (121) from the wellbore (120), and wellhead valve (132) may be fully closed to fully restrict (or "block") the flow of production (121) from the wellbore (120), and through the well surface system (124).

Keeping with FIG. 1A, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature and flow rate of production (121) flowing through the wellhead (130), or other conduits of the well surface system (124), after exiting the wellbore (120).

In some embodiments, the surface sensing system (134) includes a surface pressure sensor (136) operable to sense the pressure of production (121) flowing through the well surface system (124), after it exits the wellbore (120). The surface pressure sensor (136) may include, for example, a wellhead pressure sensor that senses a pressure of production (121) flowing through or otherwise located in the wellhead (130). In some embodiments, the surface sensing system (134) includes a surface temperature sensor (138) operable to sense the temperature of production (121) flowing through the well surface system (124), after it exits the wellbore (120). The surface temperature sensor (138) may include, for example, a wellhead temperature sensor that senses a temperature of production (121) flowing through or otherwise located in the wellhead (130), referred to as "wellhead temperature" (Twh). In some embodiments, the surface sensing system (134) includes a flow rate sensor (139) operable to sense the flow rate of production (121) flowing through the well surface system (124), after it exits the wellbore (120). The flow rate sensor (139) may include hardware that senses a flow rate of production (121) (Qwh) passing through the wellhead (130).

Maintenance on the wellhead (130) is conducted on a routine basis. One of the maintenance tasks is to inject grease under pressure into each valve in the Christmas tree or wellhead (130). The conventional greasing operation may be performed manually by a human operator using an air operated grease pump. The greasing operation may be recorded manually without concrete data to verify that the greasing operation has taken place satisfactorily and measurement records of valve deterioration or condition. The manual greasing operation quality is largely uncontrolled and open to operator variations.

It is important to consider the amount of greasing that enters the valve cavity during the operation of greasing. It is not recommended to pump more than required as any extra amount of pumped grease goes into the wellbore and contributes to an accumulation of sticky material inside the wellbore or producing facilities. Furthermore, less grease than required or recommended by the manufacturer may cause damage to the valve resulting in well integrity issues.

An accurate methodology to measure the volume of pumped grease is not available in conventional manual greasing operation. In some embodiments, the well system (106) includes a digital greasing intelligent tool (DGIT) (160). For example, the DGIT (160) may include hardware and/or software with functionality to digitally pump grease while recording the information such as initial wellhead pressure, amount of grease pumped, valve name and manufacture, etc. to be used for subsequent analysis. A database of recorded information may be interrogated using machine learning and artificial intelligence techniques to identify continuous process improvement. For example, the quality of an individual operator's greasing technique may be monitored and analyzed over a time period, or the deterioration of a valve may be identified over time to enable proactive maintenance or repair.

While the DGIT (160) is shown at a location where the well system (106) is located (i.e., well site), in other embodiments the DGIT (160) is a mobile tool located away from well sites. In some embodiments, the DGIT (160) may include a computer system that is similar to the computer system (400) described below with regard to FIG. 4 and the accompanying description.

Turning to FIGS. 1B-1F, FIGS. 1B-1F illustrate further details of the of DGIT (160) depicted in FIG. 1A above. In one or more embodiments, one or more of the modules and/or elements shown in FIGS. 1B-1F may be omitted, repeated, combined and/or substituted. Accordingly, embodiments disclosed herein should not be considered limited to the specific arrangements of modules and/or elements shown in FIGS. 1B-1F.

Figure 1B:
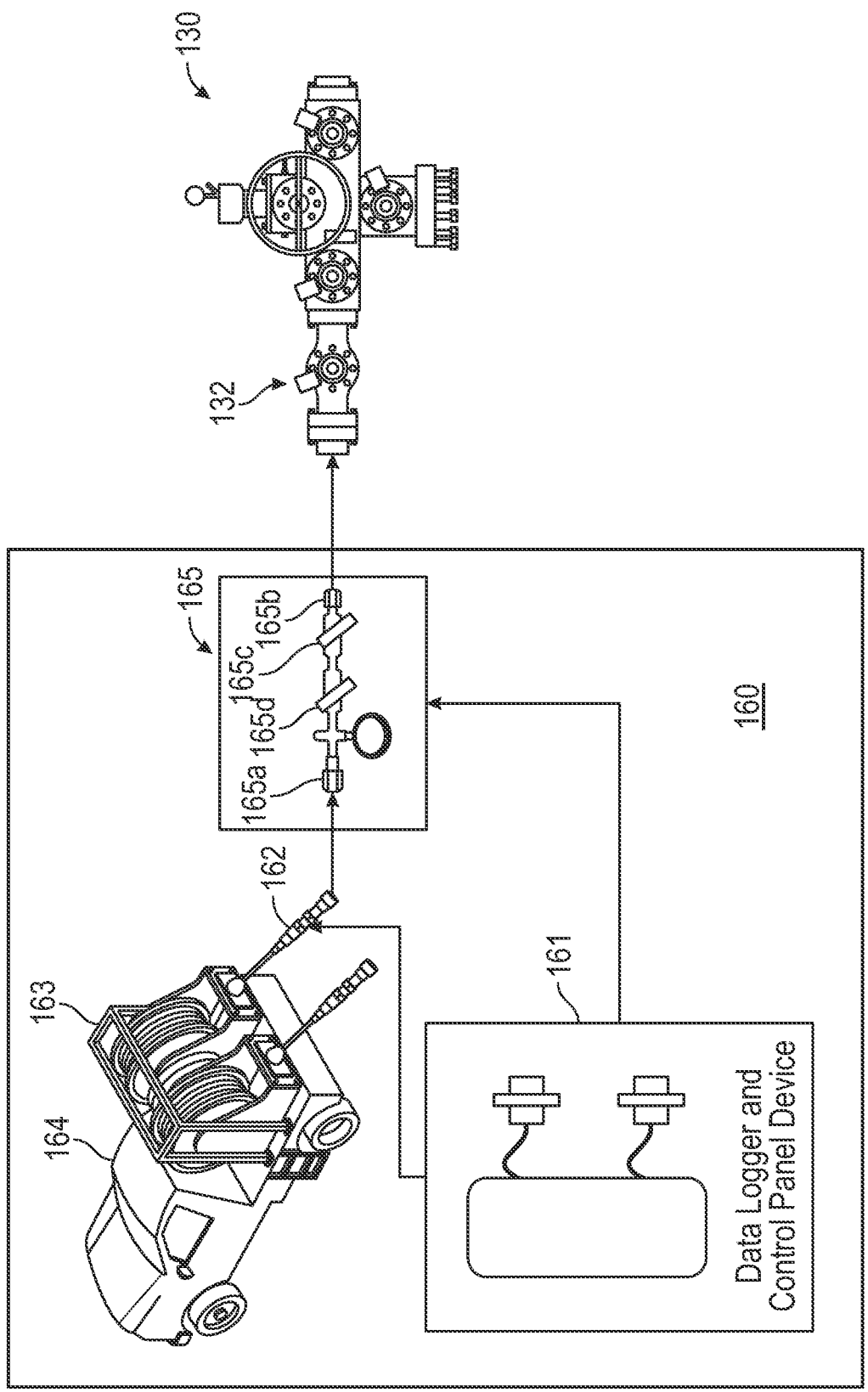

As shown in FIG. 1B, the DGIT (160) includes a greasing adapter (165), a data logger and control panel device (161), and a grease gun (162). The grease gun (162) is a grease injector that injects lubricating grease from a grease supply device (163) into the wellhead valve (132) via the greasing adapter (165). The grease gun (162) may inject the grease under manual control in response to an operator trigger on the grease gun (162) or inject the grease automatically in response to a control signal from the data logger and control panel device (161).

The greasing adapter (165) is a connecting device that provides ability to connect a valve with different sizes of grease guns (e.g., grease gun (162)). The greasing adapter (165) includes a grease gun side fitting (165a) for connecting to the grease gun (162), a valve side fitting (165b) for connecting the wellhead valve (132), and a measurement manifold having a flow meter (165c) and a pressure sensor (165d). The greasing adapter (165) is adapted to allow conducting pressure and flow measurements of the grease at the grease gun (162) positioned near the wellhead (130) (as shown in FIG. 1A) while having the data logger and control panel device (161) away from the grease gun (162) for operator safety.

Figure 1C:
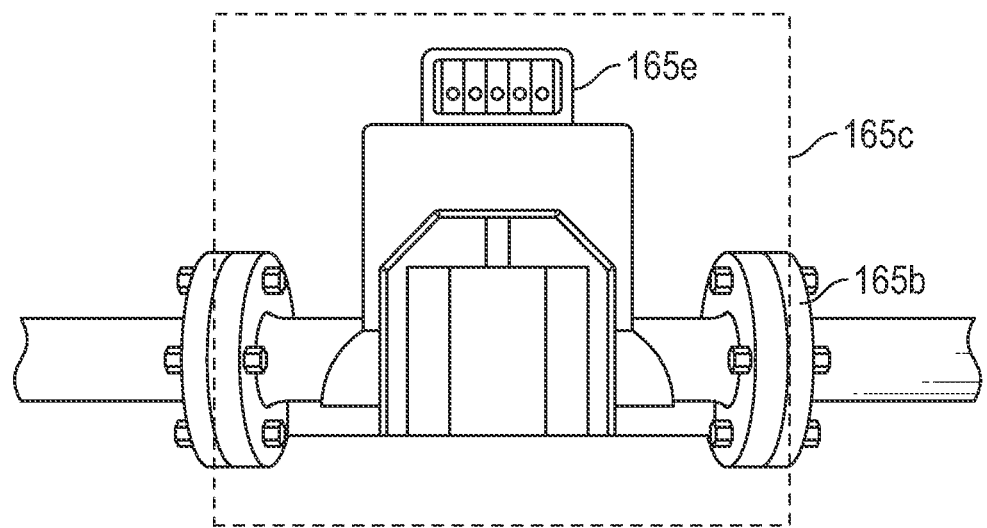

FIG. 1C shows an example flow meter (165c) having the valve side fitting (165b) on one end and another fitting on the opposite end for connecting the pressure sensor (165d). A counter mechanism (165e) determines, as a function of time, the total amount of grease flowing through the flow meter (165c). The grease gun (162) injects the grease in a sequence of individual injections. Each individual injection is activated manually or in response to a control signal. Each activation is referred to as a stroke of the grease gun, or simply stroke. In one or more embodiments, the pressure sensor (165d) is integrated in the counter mechanism (165e) to measure the pressure drop across the flow meter (165c). For example, differential pressure may be captured across the flow meter as part of the grease counter mechanism. While the flowmeter provides digital flowrate data, the pressure upstream and downstream of the flowmeter is likely to be very similar. As an alternative embodiment, volume of grease flow may be deduced by a single pressure measurement and counting of pressure spikes alone by monitoring the flowmeter differential pressure reading. As the grease gun injects grease flowing through the flow meter (165c), the pressure drop (i.e., differential pressure) exhibits successive pressure spikes (corresponding to the strokes) at periodic intervals, e.g., corresponding to each squeeze of the manual trigger of the grease gun (162) during a manual operation of the grease gun (162). The counter mechanism (165e) counts the number of pressure spikes as the stroke count. The total amount of injected grease may be calculated as the injected grease amount per stroke multiplied by the stroke count using a known displacement volume per stroke factor. On the other hand, inconsistent differential pressure is an indicator of the operator's failure to flash the cleaner from the system, as the operator needs to use cleaner to flash the system before starting greasing. In particular, changes in differential pressure may indicate change in the density of the flow between grease and cleaner fluid.

Figure 1D:
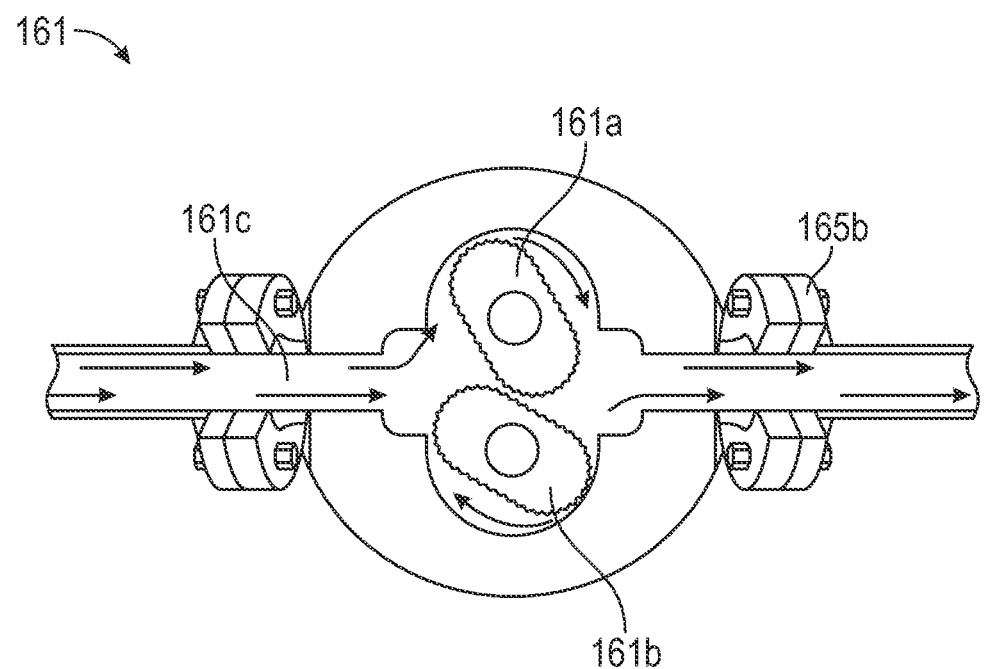

FIG. 1D shows a cross sectional view of the flow meter (165c) having two rotating gears (161a, 161b) inside a chamber of the flow meter (165c). The injected grease flow (161c) causes the gears (161a, 161b) to rotate. Each time the gears (161a, 161b) complete a full rotation, a precise amount of injected grease passes through the flow meter (165c). The total amount of injected grease may be calculated as the injected grease amount per rotation, based on empirical data obtained through device calibration, multiplied by a rotation count. For example, the rotation count may be generated by the counter mechanism (165e).

Figure 1E:
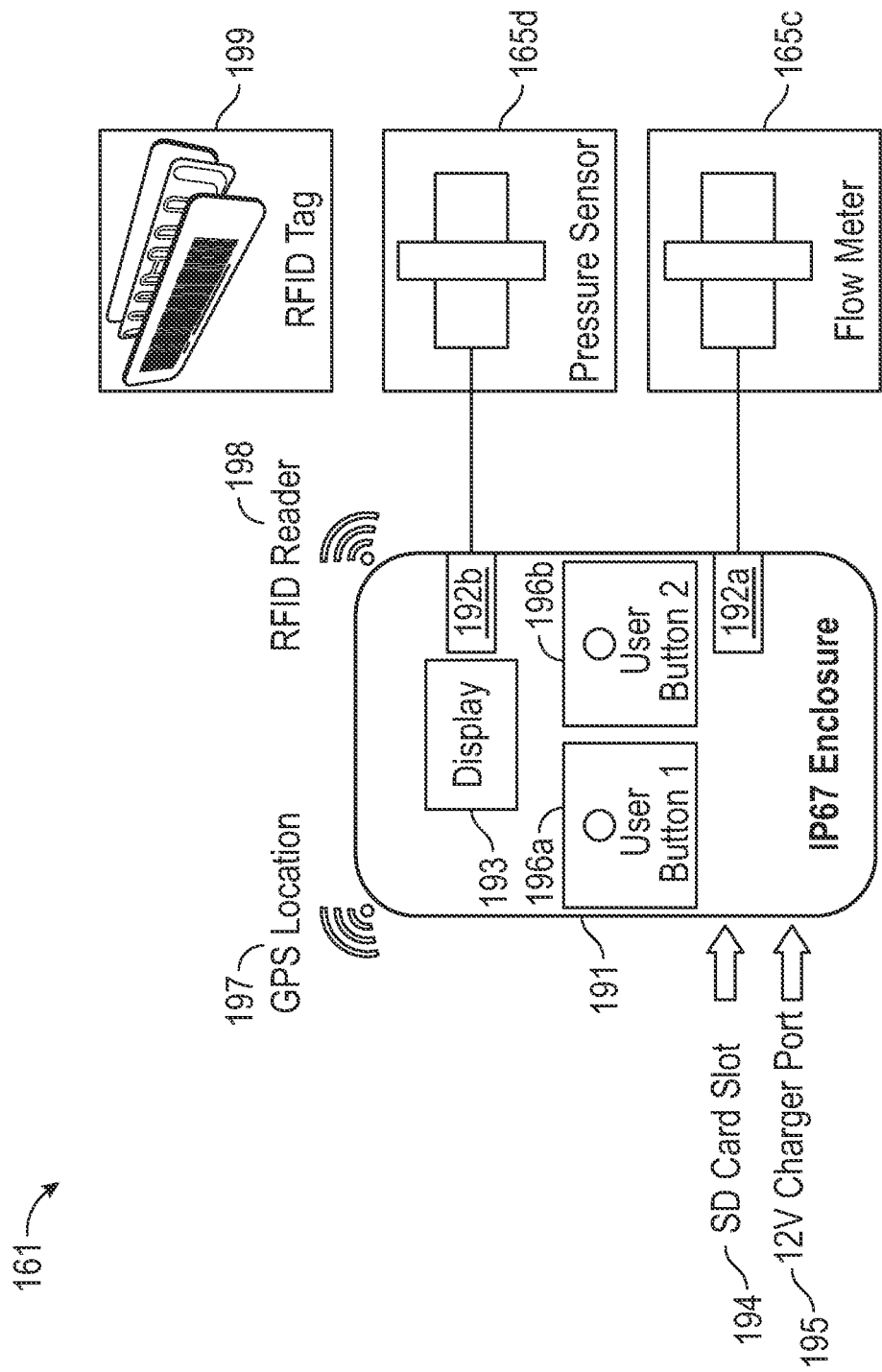

FIG. 1E shows a schematic diagram of the data logger and control panel device (161). The data logger and control panel device (161) includes hardware and/or software with functionality for data logging and grease injection control for a wellhead valve greasing operation. In one or more embodiments, the data logger and control panel device (161) includes functionality for digitizing data records of wellhead valve greasing operations, automatic well and wellhead valve data recognition and verification, automatic generation of greasing operation volume recommendations, geolocating and timestamping the digital maintenance records of the wellhead valve greasing operation, and generating advanced greasing operation analytics.

As shown in FIG. 1E, the data logger and control panel device (161) includes an enclosure (191), a sensor interface (192a), a sensor interface (192b), a GPS receiver (197), a radio frequency identification (RFID) reader/scanner (198), a memory slot (194), a charging port (195), user buttons (196a, 196b), and a display (193). The enclosure (191) is a housing (e.g., waterproof with a IP67 rating) for containing the hardware and/or software components. The sensor interface (192a) is a data communication interface for recording sensor data from the flow meter (165c). The sensor interface (192b) is a data communication interface for recording sensor data from the pressure sensor (165d). The GPS receiver (197) is a hardware/software module for recording global positioning system (GPS) location information. The radio frequency identification (RFID) reader/scanner (198) hardware/software module for recording (reading or scanning) information from RFID tags (e.g., RFID tag (199). The memory slot (194) is a circuit receptacle for receiving a memory card (e.g., a security digital (SD) memory card). The charging port (195) is a circuit receptacle for connecting to a electrical power charger. The user buttons (196a, 196b) are physical or touch-sensitive buttons for receiving user commands. The display (193) is a flat panel screen for display recorded data or control information. In particular, the GPS receiver (197) is used to geolocate and validate physical location of the maintenance equipment (e.g., wellhead valve (132) at the site of the wellhead (e.g., wellhead (130)) at the time of the greasing operation. The recorded GPS coordinates are automatically cross-referenced to a database of known well location coordinates to confirm physical presence at the maintenance equipment. GPS information also includes precise time data to be used to accurately timestamp data logs.

In one or more embodiments, an RFID tag (199) is added as the asset identifier to each valve to be maintained (greased) for unique identification of each item of wellhead hardware. Accordingly, unique asset ID information recorded by the RFID reader (198) is used to cross reference a database of inventoried equipment types and corresponding grease volumes required for optimal maintenance. Alternatively, QR codes may be used as the asset identifier to each valve to be maintained (greased). In this scenario, the data logger and control panel device (161) includes a QR code reader to record the asset identifier information of the valve to be greased.

Figure 1F:
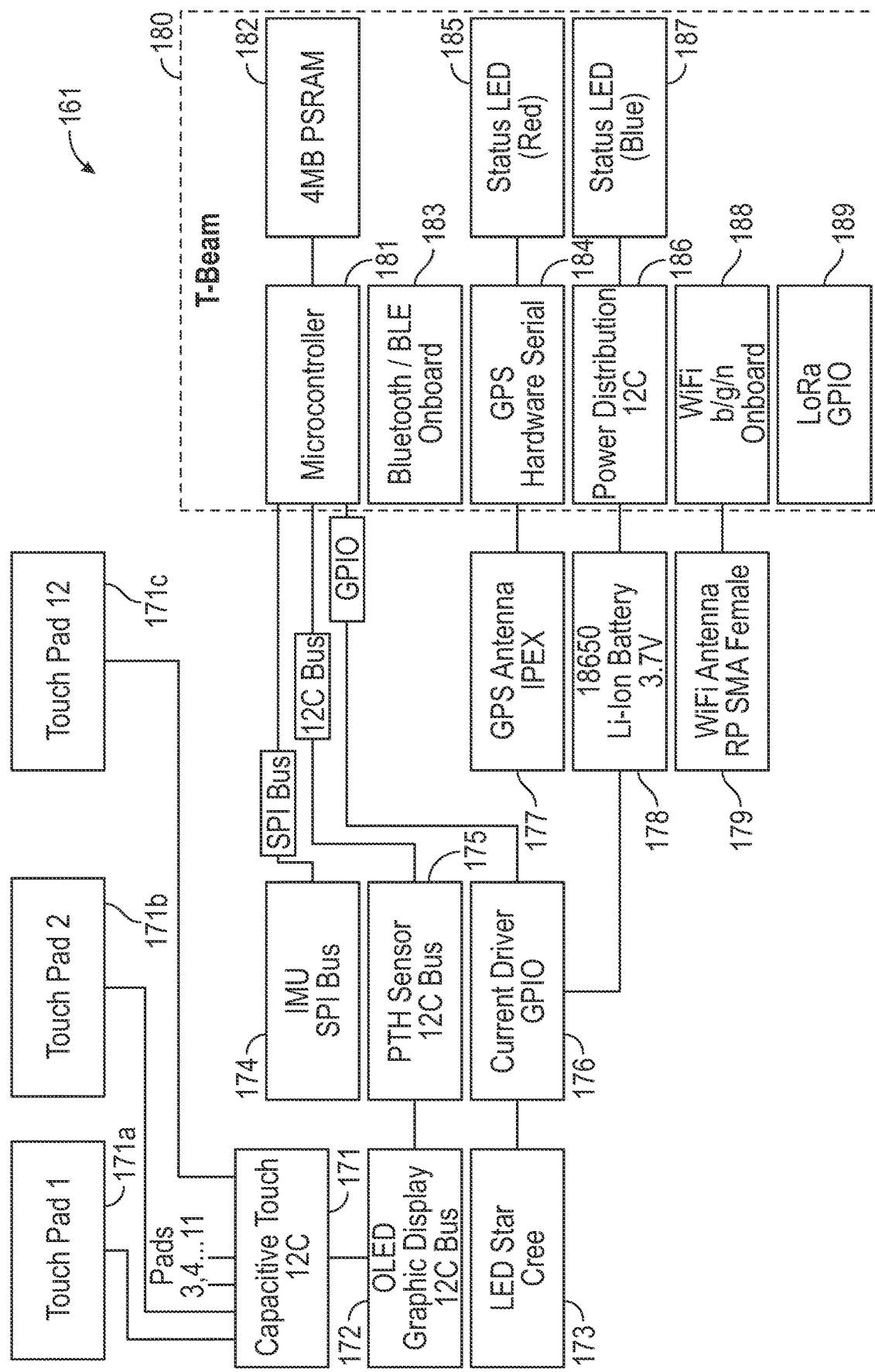

FIG. 1F shows a functional block diagram of the data logger and control panel device (161). As shown in FIG. 1F, the data logger and control panel device (161) is a microprocessor based electronic device capable of logging recorded sensor data (e.g., from the flow meter (165c) and pressure sensor (165d)) to an embedded or inserted memory device. The log data is tagged with a time stamp and other metadata, such as GPS location and various RFID information. The data logger and control panel device (161) includes a software program to verify the recorded grease injection information with manufacturer recommended grease volume and generate an alert if a variance to the recommended grease volume is detected to verify quality of maintenance task.

As shown in FIG. 1F, the data logger and control panel device (161) includes a core module (180), a serial peripheral interface (SPI) (174), an inter-integrated circuit (I2C) interface (175), a general peripheral input output (GPIO) interface (176), a GPS antenna (177), a battery (178), and a WiFi antenna (179). The SPI (174), I2C interface (175) and GPIO interface (176) connect various devices, such as the graphic display (172), LED indicators (173), and capacitive touch pad interface (171) for touch pads (171a, 171b, 171c). The core (180) includes a microprocessor (181), a software program memory (182), a Bluetooth interface (183), a GPS interface (184) having an LED indicator (185), a power distribution circuit (186) having an LED indicator (187), a WiFi interface (188), and a long range radio (LoRa) interface (189). Based on the collection of the devices in the core (180), the core (180) is referred to as a computer core module. The components collectively enable digitized maintenance records to be output and stored in a data logger database. Once a large number of records are established, artificial intelligence and machine learning techniques are applied to the data logger database to establish trends leading to optimization and predictive maintenance. An example of the data logger database is described in reference to FIG. 3 below.

Figure 2A:
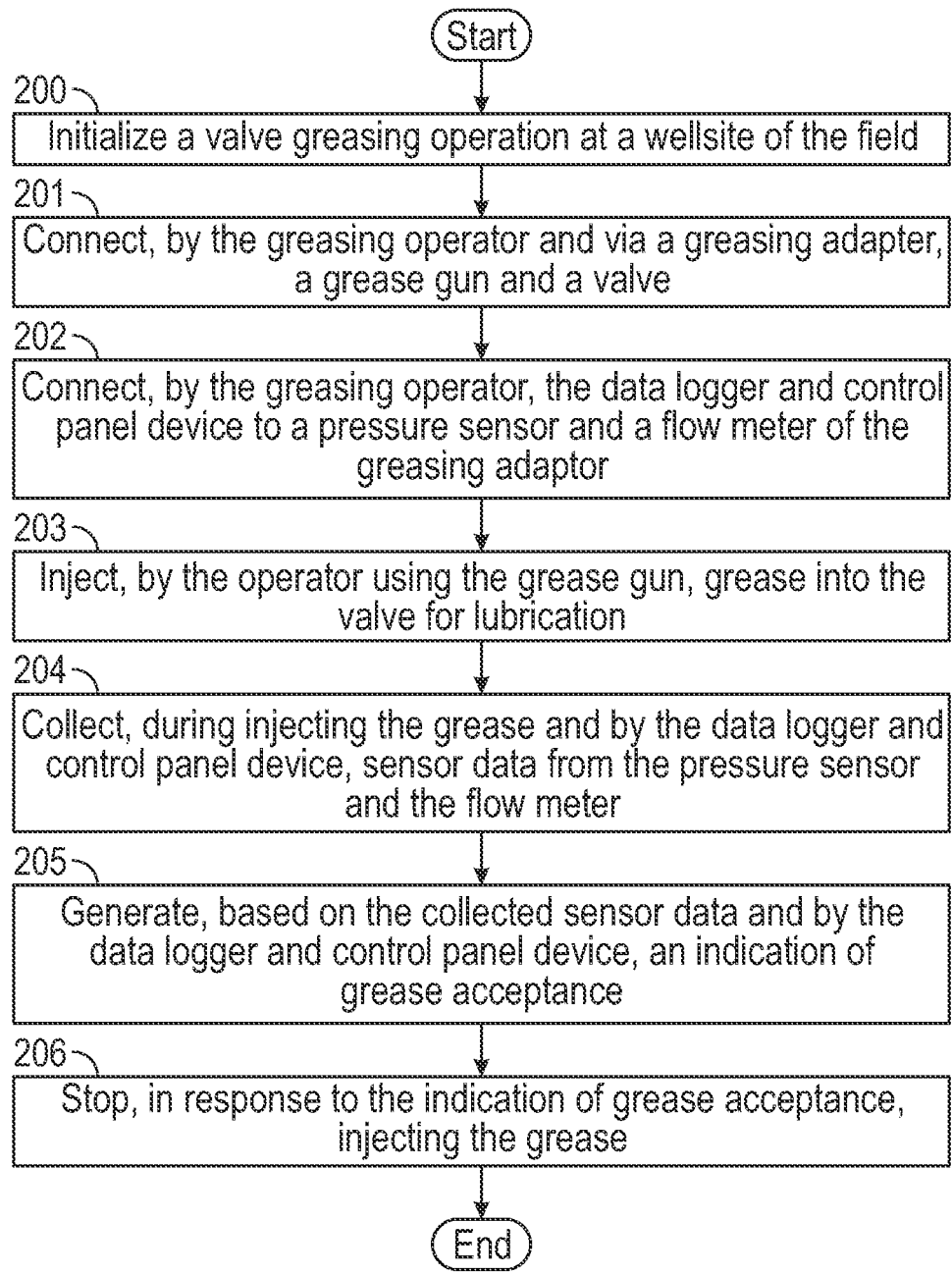
FIGS. 2A-2B show method flowcharts in accordance with one or more
embodiments.
Figure 2B:
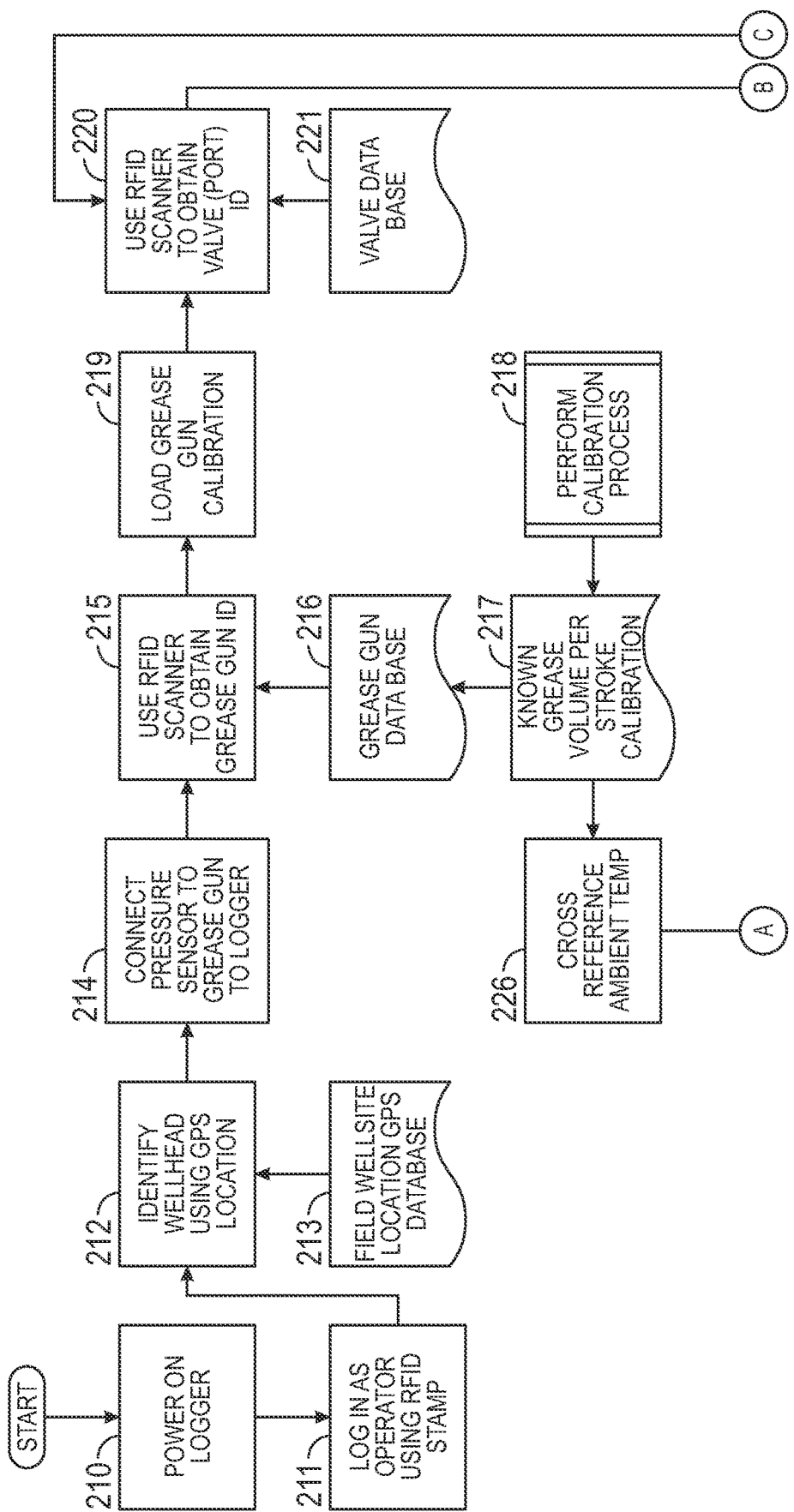
Figure 2B:
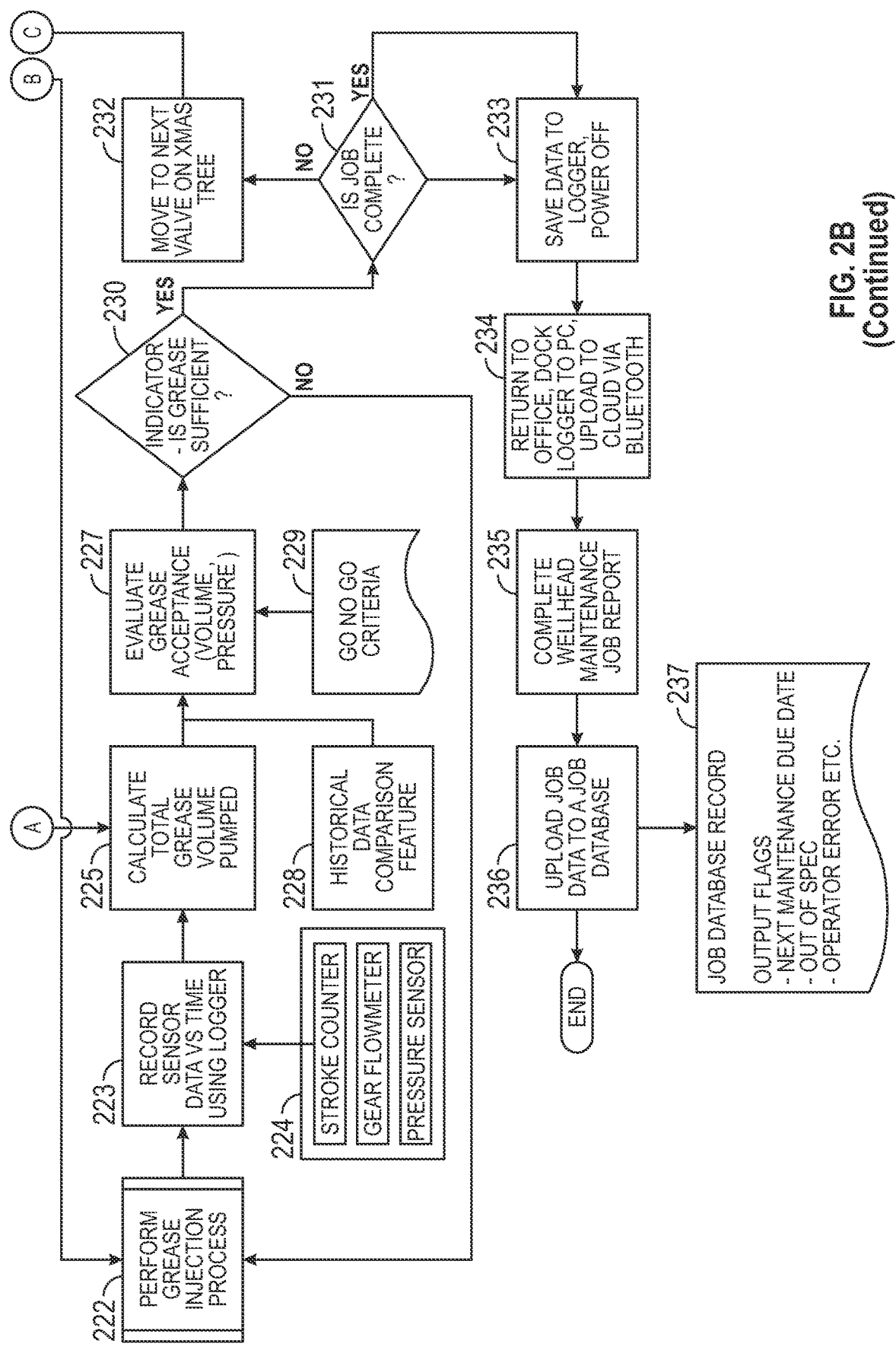

FIGS. 2A-2B show flowcharts in accordance with one or more embodiments disclosed herein. One or more of the steps in FIGS. 2A-2B may be performed by the components of the well environment (100) and the DGIT (160), discussed above in reference to FIGS. 1A-1F. In one or more embodiments, one or more of the steps shown in FIGS. 2A-2B may be omitted, repeated, and/or performed in a different order than the order shown in FIGS. 2A-2B. Accordingly, the scope of the disclosure should not be considered limited to the specific arrangement of steps shown in FIGS. 2A-2B.

As shown in FIGS. 2A-2B, the flowcharts describe a method to perform wellhead valve greasing operations for a field having a large number of wells. During each greasing operation, pertinent data is generated, stored, and tagged by well name and valve numbers in order to operate an efficient maintenance program of the entire field. Accordingly, the process auditors and data validators have a clear criterion to evaluate the completed greasing operations. The tagged data that previously stored by well name and valve numbers are efficiently analyzed to recognize whether the greasing operations have been performed properly. The wellhead valves have to be greased by the recommended volume of grease during the greasing operation. That volume is recommended by the manufacturer which defines the parameter used to accept or reject the greasing operation during data validation. Moreover, the stored data is analyzed to anticipate any valve due for maintenance to avoid damage.

Turning to FIG. 2A, FIG. 2A shows a process flowchart for performing a maintenance operation of a field that has a number of wellsites.

Initially in Step 200, a valve greasing operation is initiated at a wellsite of the field. Initializing the valve greasing operation includes obtaining an operator identifier of a greasing operator, a wellhead identifier of a wellhead at the wellsite, a grease gun identifier of a grease gun used by the greasing operator, and a valve identifier of a valve of the wellhead.

In Step 201, the grease gun and the wellhead valve are connected by the greasing operator and via a greasing adapter that has a pressure sensor and a flow meter. In Step 202, the data logger and control panel device is connected by the greasing operator to the pressure sensor and the flow meter. The connection may be based on wired or wireless data communication signals. Those skilled in the art will appreciate that these connections may be manual or automated by software.

Figure 4:
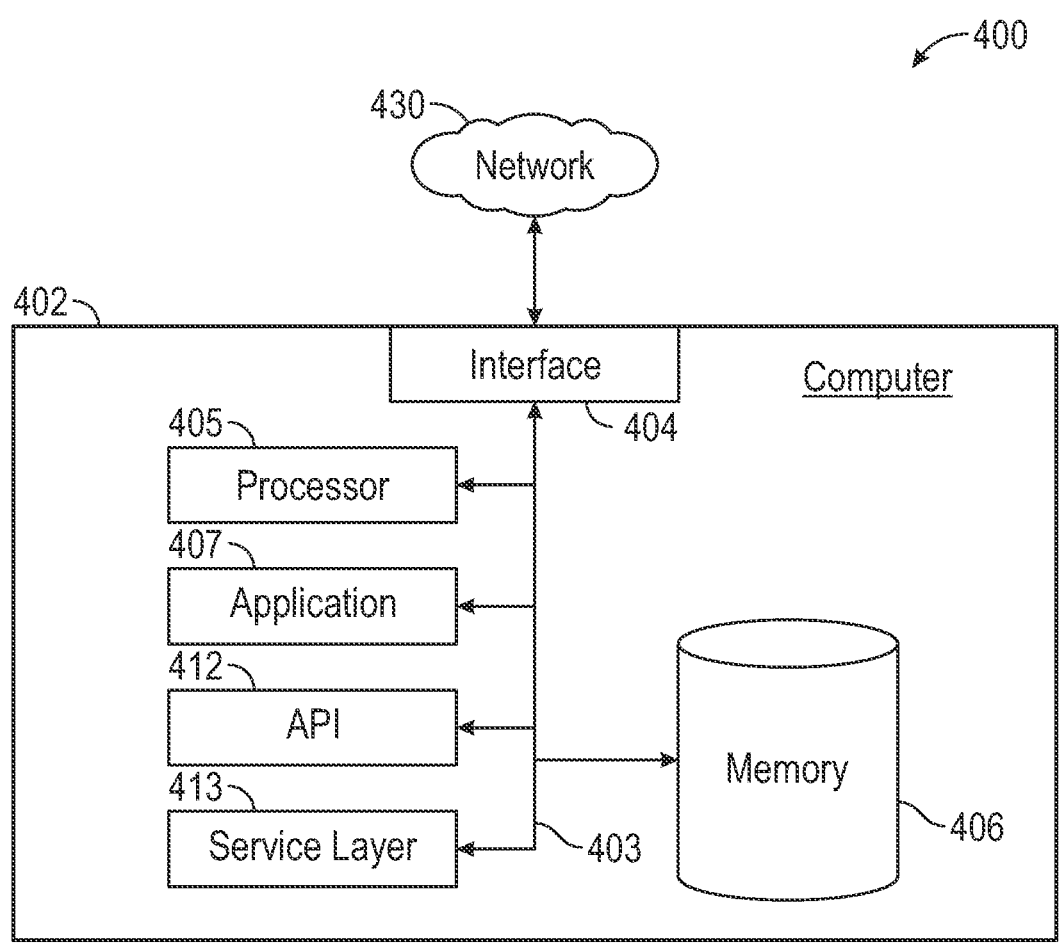
FIG. 4 shows a computing system in accordance with one or more embodiments.

In Step 203, grease is injected by the operator using the grease gun into the valve for lubrication. Again, the injection may be initiated manually or may be automated via software using a computer system as shown in FIG. 4 and described below.

In Step 204, during injection of the grease, sensor data is collected by the data logger and control panel device from the pressure sensor and the flow meter.

In Step 205, an indication of grease acceptance is generated by the data logger and control panel device based on the collected sensor data.

In Step 206, the grease injection is stopped in response to the indication of grease acceptance. At this stage, the data logger and control panel device and the greasing adapter are disconnected from each other and from the grease gun and the wellhead valve. Data obtained from the sensors is saved to the data logger and control panel device before the power of the data logger and control panel device is turned off. The wellhead is returned back to normal operation at the wellsite.

The method of FIG. 2A facilitates the digitization of valve greasing job records, introduction of smart features for auto-well and wellhead valve data recognition and verification, auto generation of greasing job volume recommendations, and establishment of advanced greasing job analytics. Specifically, embodiments disclosed herein serve job efficiency and automation as well as compliance audit through geolocation and timestamping of digital maintenance records for verification purposes using a portable microcontroller device. Furthermore, embodiments disclosed herein enable the operators to know the exact amount of grease pumped inside the valve cavity and provides an option to retrieve the information to conduct any study or to perform any analysis.

FIG. 2B shows further details of the flowchart depicted in FIG. 2A above. In particular, Steps 210-221 correspond to Steps 200-202 in FIG. 2A, Steps 222-226 correspond to Step 204 in FIG. 2A, and Steps 227-237 correspond to Steps 205-206 in FIG. 2A.

Initially in Step 210, the data logger and control panel device of the digital greasing intelligent tool at the wellsite is turned on upon an operator arriving at the wellsite to perform a greasing operation of a wellhead. For example, the operator is dispatched the wellsite to perform a dispatched wellhead maintenance job of greasing a number of valves, referred to as the dispatched job. In one or more embodiments, the data logger and control panel device may be any computing device such as that shown in FIG. 4. For example, the data logger and control panel device may be a mobile device or tablet carried by the operator to the wellsite.

In Step 211, the operator logs in to the data logger and control panel device using an RFID tag of the operator. In Step 212, the wellhead is identified by the data logger and control panel device obtaining the GPS location near the wellhead.

In Step 213, the obtained GPS location is compared to a wellsite database storing GPS locations of all wellsites throughout the field to search for a matched entry in the database. The wellhead is then identified based on the matched entry that contains pertinent information of the wellhead at the wellsite.

In Step 214, a pressure sensor is connected to a grease gun (i.e., grease gun) and to the data logger and control panel device. The connection to the grease gun allows flow of the grease for lubricating the wellhead valve. The connection to the data logger and control panel device allows pressure information to be monitored and stored for analysis. In one or more embodiments, the pressure sensor is included in a greasing adapter brought to the wellsite by the operator, e.g., to have data measurement as close to the wellhead valve as possible for accurate quality assurance and quality control. The greasing adapter includes a flow meter that is connected to a grease lubrication port of the wellhead valve prior to the greasing operation. The digital pressure sensor may be located close to the wellhead but connected via a long cable to the data logger and control panel device located further away, e.g., outside the explosive atmosphere zone near the wellhead. Alternatively, the pressure sensor may also be located away from the wellhead and nearer to the greasing apparatus (e.g., on a truck); however there is a downside to this configuration as the pressure signal may decay if a long grease hose is used.

In Step 215, the grease gun identifier (ID) is obtained using the RFID reader/scanner of the data logger and control panel device.

In Step 216, the obtained grease gun ID is compared to a grease gun database storing RFIDs of all grease guns used throughout the field to search for a matched entry in the database. The grease gun is then identified based on the matched entry that contains pertinent information of the grease gun, such as the calibration of known grease volume per stroke of each grease gun in Step 217. In particular, the calibration of known grease volume per stroke of each grease gun were previously performed using a calibration process in Step 218.

In Step 219, the calibration of known grease volume per stroke of the connected grease gun, as identified in Step 215 is loaded into the data logger and control panel device.

In Step 220, the wellhead valve identifier (ID) is obtained using the RFID reader/scanner of the data logger and control panel device.

In Step 221, the obtained valve ID is compared to a valve database storing RFIDs of all valved installed throughout the field to search for a matched entry in the database. The wellhead valve is then identified based on the matched entry that contains pertinent information of the valve, such as manufacturer specified lubrication grease amount.

In Step 222, the grease injection process is initiated. For example, the grease gun injects the grease under manual control in response to an operator trigger on the grease gun. In another example, the grease gun injects the grease automatically in response to a control signal from the data logger and control panel device.

In step 223, pressure sensor data and flow meter data are recorded with respect to time using the data logger and control panel device. The sensor data is obtained in Step 224 from the connected pressure sensor with a stroke counter, and/or from the connected flow meter with a rotation counter. A spike or peak in the measured pressure versus time is referred to as a stroke of the grease gun. The stroke counter detects the number of pressure spikes to determine the stroke count.

In Step 225, the total pumped grease volume is calculated by the data logger and control panel device. For example, the total pumped grease volume is calculated by multiplying a stroke count from the stroke counter and the known grease volume per stroke of the grease gun, as determined in Steps 215-217. The known grease volume per stroke of each grease gun may be adjusted according to the ambient temperature in Step 226.

In Step 227, a measure of grease acceptance is evaluated with respect to the calculated total pumped grease volume and the recorded pressure over time. The evaluation is based on comparing to historical data in Step 228, and obtaining a evaluation criteria in Step 229. For example, the evaluation criteria includes comparing the calculated total pumped grease volume and the manufacturer specified lubrication grease amount. The measure of grease acceptance may correspond to a ratio of the calculated total pumped grease volume over the manufacturer specified lubrication grease amount.

In Step 230, a determination is made as to whether the measure of grease acceptance meets or exceeds (i.e., sufficient) a pre-determined threshold, such as 95%, 100%, 110%, etc. If the determination is positive, i.e., the measure of grease acceptance is sufficient, the method proceeds to Step 231. If the determination is negative, i.e., the measure of grease acceptance is not sufficient, the method returns to Step 222.

In Step 231, a determination is made as to whether the dispatched job is complete for all the valves of the wellsite. If the determination is positive, i.e., the job is complete, the method proceeds to Step 233. If the determination is negative, i.e., the job is not complete, the method proceed to Step 232 where the operator moves on to the next valve at the wellsite before the method returns to Step 220.

In Step 233, Data obtained from the sensors and subsequent calculations (referred to as job data) are saved to the data logger and control panel device before the power of the data logger and control panel device is turned off.

In Step 234, the data logger and control panel device is connected to a computer at an office where the operator returns to after completing the dispatched job. The data saved on the data logger and control panel device from the completed dispatched job (i.e., job data) is uploaded to the Cloud, i.e., computing resources on the Internet.

In Step 235, a wellhead maintenance job report is completed. The report is based on the job data uploaded in Step 234 above.

In Step 236, the uploaded job data for the dispatched job is added to a database of ongoing maintenance jobs of all wellsite throughout a field, referred to as a job database. For example, the job database may be analyzed in Step 237 to generate output flags (referred to as maintenance notices) such as next maintenance due date, problem (e.g., out-of-spec) status of a particular valve, an operator performance measure (e.g., error instances), etc. In one or more embodiments, a training data set is generated by at least combining the job database and cumulative records of valve repair and replacement throughout the field. Accordingly, a machine learning algorithm for the maintenance operation of the field is trained based on the training data set. The machine learning algorithm is then used to generate maintenance notices to facilitate the maintenance operation of the field.

Figure 3:
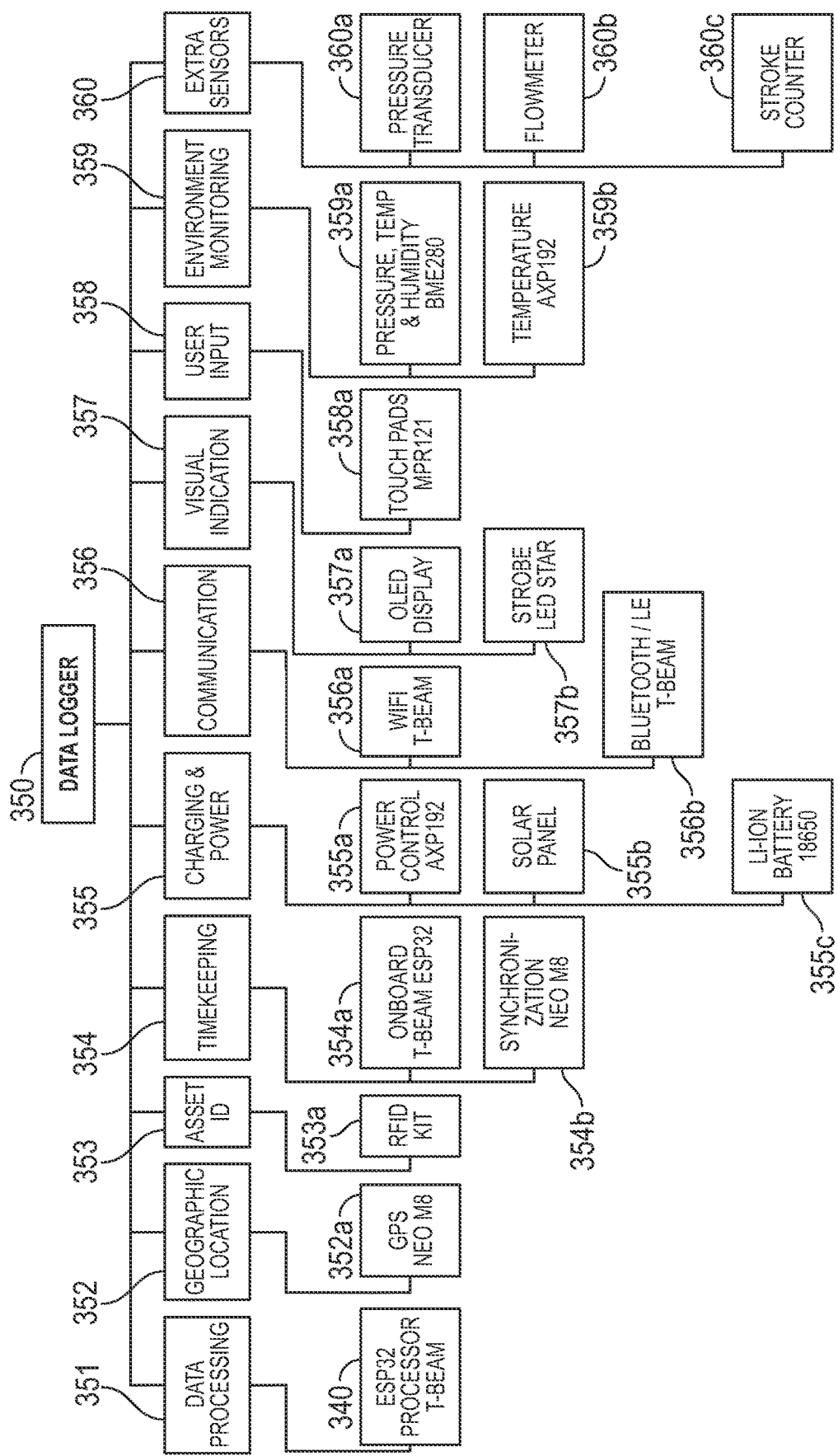
FIG. 3 shows an example in accordance with one or more embodiments.

FIG. 3 shows an implementation example in accordance with one or more embodiments. The implementation example shown in FIG. 3 is based on the system and method described in reference to FIGS. 1A, 1B, 2A, and 2B above.

As shown in FIG. 3, the example data logger database (350) includes numerous data records relating to data processing (351), geographic location (352), asset identifier (353), time keeping information (354), charging and power information (355), communication information (356), visual indicator information (357), user input (358), environment monitoring information (359), and extra sensor information (360). For example, these data records further relate to processor information (340) of the core module (180), GPS information (352a) of the GPS interface (184), RFID information (353a) of the RFID reader (198), onboard timer information (354a), timing synchronization information (354b), as well as information relating to the power control (355a), solar panel (355b), lithium-ion battery (355c), WiFi (356a), Bluetooth (356b), OLED display (357a), strobe LED (357b), touch pads (358a), pressure/temperature/humidity sensors (359a), temperature gauge (359b), pressure transducer (360a), flowmeter (360b), and stroke counter (360c).

In one or more embodiments, one or more portions of the data logger database (350) is used to form a training data set for machine learning techniques. For example, the training data set may include patterns of greasing job data (e.g., grease volume, injection pressure, injection time and rate, etc.) that are captured, stored and analyzed against other relevant data in the training data set or from a separate database (e.g., wellhead valve type and manufacturer, valve age, production history, valve leaks or failure history, etc.) to predict valve integrity. For example, the greasing job data pattern may include the extent (e.g., full volume or partial volume) of pumping the grease inside the valve cavity.

Decreasing pumped volume over time is an indicator of foreign material buildup inside the valve. The stored data relating to the pumped volume measurements may be used to classify this phenomenon according to $H_2S$ concentration, water cut, pressure, and other parameters. In one or more embodiments, the training data set is generated by at least combining the data logger database and cumulative records of valve repair and replacement throughout the field. A machine learning algorithm for the maintenance operation of the field is then trained based on the training data set. Such machine learning algorithms may include, but are not limited to, supervised machine learning algorithms, unsupervised learning algorithms, and deep learning machine learning algorithms (e.g., neural networks, random forests, generalized linear models, and Bayesian regression).

Accordingly, the recorded information in the training data set is interrogated using the trained machine learning algorithms and artificial intelligence techniques to identify continuous process improvement. For example, the quality of an individual operator's greasing technique may be monitored and analyzed over a time period. In another example, the machine learning output may include the result to identify the long term deterioration of a particular valve over time to enable proactive maintenance or repair.

Advantageously, fitting a digital pressure sensor to a grease injection gun enables interpretation of pressure spikes to detect strokes i.e., pumping volume. Software can be used on a microcontroller to detect pressure spikes, label as "stroke." Measuring and recording pressure vs. timestamp for the grease injection process can be used as a record for quality control and remote process verification. By comparing digital records over time, embodiments disclosed herein enable detection of valves wearing (washing). For example, a historical cross reference of past job pressure spikes can be analyzed to deduce the likelihood of this occurrence. Digital records enable detection of operator error from analysis of amplitude and frequency of pressure spikes. In addition, verification of the correct process steps is enabled by geographical location with GPS. Competent operator verification is also enabled by embodiments disclosed herein using RFID tags. Unique equipment ID using RFID facilitates verified calibration of equipment. Process accuracy is improved by use of temperature sensor built into the microprocessor.

Embodiments may be implemented on a computer system. FIG. 4 is a block diagram of a computer system (402) used to provide computational functionalities associated with described algorithms, methods, functions, processes, flows, and procedures as described in the instant disclosure, according to an implementation. The illustrated computer (402) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (402) may include a computer that includes an input device, such as a keypad, keyboard, touch screen, or other device that can accept user information, and an output device that conveys information associated with the operation of the computer (402), including digital data, visual, or audio information (or a combination of information), or a GUI.

The computer (402) can serve in a role as a client, network component, a server, a database or other persistency, or any other component (or a combination of roles) of a computer system for performing the subject matter described in the instant disclosure. The illustrated computer (402) is communicably coupled with a network (430). In some implementations, one or more components of the computer (402) may be configured to operate within environments, including cloud-computing-based, local, global, or other environment (or a combination of environments).

At a high level, the computer (402) is an electronic computing device operable to receive, transmit, process, store, or manage data and information associated with the described subject matter. According to some implementations, the computer (402) may also include or be communicably coupled with an application server, e-mail server, web server, caching server, streaming data server, business intelligence (BI) server, or other server (or a combination of servers).

The computer (402) can receive requests over network (430) from a client application (for example, executing on another computer (402)) and responding to the received requests by processing the said requests in an appropriate software application. In addition, requests may also be sent to the computer (402) from internal users (for example, from a command console or by other appropriate access method), external or third-parties, other automated applications, as well as any other appropriate entities, individuals, systems, or computers.

Each of the components of the computer (402) can communicate using a system bus (403). In some implementations, any or all of the components of the computer (402), both hardware or software (or a combination of hardware and software), may interface with each other or the interface (404) (or a combination of both) over the system bus (403) using an application programming interface (API) (412) or a service layer (413) (or a combination of the API (412) and service layer (413). The API (412) may include specifications for routines, data structures, and object classes. The API (412) may be either computer-language independent or dependent and refer to a complete interface, a single function, or even a set of APIs. The service layer (413) provides software services to the computer (402) or other components (whether or not illustrated) that are communicably coupled to the computer (402). The functionality of the computer (402) may be accessible for all service consumers using this service layer. Software services, such as those provided by the service layer (413), provide reusable, defined business functionalities through a defined interface. For example, the interface may be software written in JAVA, C++, or other suitable language providing data in extensible markup language (XML) format or other suitable format. While illustrated as an integrated component of the computer (402), alternative implementations may illustrate the API (412) or the service layer (413) as stand-alone components in relation to other components of the computer (402) or other components (whether or not illustrated) that are communicably coupled to the computer (402). Moreover, any or all parts of the API (412) or the service layer (413) may be implemented as child or sub-modules of another software module, enterprise application, or hardware module without departing from the scope of this disclosure.

The computer (402) includes an interface (404). Although illustrated as a single interface (404) in FIG. 4, two or more interfaces (404) may be used according to particular needs, desires, or particular implementations of the computer (402). The interface (404) is used by the computer (402) for communicating with other systems in a distributed environment that are connected to the network (430). Generally, the interface (404) includes logic encoded in software or hardware (or a combination of software and hardware) and operable to communicate with the network (430). More specifically, the interface (404) may include software supporting one or more communication protocols associated with communications such that the network (430) or interface's hardware is operable to communicate physical signals within and outside of the illustrated computer (402).

The computer (402) includes at least one computer processor (405). Although illustrated as a single computer processor (405) in FIG. 4, two or more processors may be used according to particular needs, desires, or particular implementations of the computer (402). Generally, the computer processor (405) executes instructions and manipulates data to perform the operations of the computer (402) and any algorithms, methods, functions, processes, flows, and procedures as described in the instant disclosure.

The computer (402) also includes a memory (406) that holds data for the computer (402) or other components (or a combination of both) that can be connected to the network (430). For example, memory (406) can be a database storing data consistent with this disclosure. Although illustrated as a single memory (406) in FIG. 4, two or more memories may be used according to particular needs, desires, or particular implementations of the computer (402) and the described functionality. While memory (406) is illustrated as an integral component of the computer (402), in alternative implementations, memory (406) can be external to the computer (402).

The application (407) is an algorithmic software engine providing functionality according to particular needs, desires, or particular implementations of the computer (402), particularly with respect to functionality described in this disclosure. For example, application (407) can serve as one or more components, modules, applications, etc. Further, although illustrated as a single application (407), the application (407) may be implemented as multiple applications (407) on the computer (402). In addition, although illustrated as integral to the computer (402), in alternative implementations, the application (407) can be external to the computer (402).

There may be any number of computers (402) associated with, or external to, a computer system containing computer (402), each computer (402) communicating over network (430). Further, the term "client," "user," and other appropriate terminology may be used interchangeably as appropriate without departing from the scope of this disclosure. Moreover, this disclosure contemplates that many users may use one computer (402), or that one user may use multiple computers (402).

In some embodiments, the computer (402) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Embodiments provide the following advantages: (i) measuring and recording pressure with respect to timestamp for the grease injection process provides a record for quality control and remote process verification, (ii) comparing digital records over time facilitates detecting valve deterioration by analyzing trends of historical pressure spikes to deduce the likelihood of this occurrence, (iii) digital records in the job database enables detection of operator error from analysis of amplitude and frequency of recorded pressure spikes, (iv) verification of the correct process steps based on GPS identified geographical locations, (v) operator competency verification based on RFID tags, (vi) unique equipment ID using RFID enables verified equipment calibration, and (vii) process accuracy is improved by use of temperature sensor built into the data logger for adjusting grease volume per stroke calibration.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for performing a greasing operation at a wellsite of a hydrocarbon field, comprising:
   initiating, using a data logger and control panel device, a valve greasing operation at a wellsite of a plurality of wellsites of a field, wherein said initializing comprises:
      obtaining an operator identifier of a greasing operator,
      a wellhead identifier of a wellhead at the wellsite,
      a grease gun identifier of a grease gun used by the greasing operator, and
      a valve identifier of a valve of the wellhead;
   communicatively connecting, by the greasing operator and via a greasing adapter, the grease gun and the valve, wherein the greasing adapter comprises a pressure sensor and a flow meter;
   connecting, by the greasing operator, the data logger and control panel device to the pressure sensor and the flow meter:
   retrieving, from a grease gun database and based on the grease gun identifier of the grease gun, a known grease volume per stroke of the grease gun;
   injecting, by the operator using the grease gun, grease into the valve for lubrication;
   collecting, during said injecting and by the data logger and control panel device, sensor data from a pressure sensor and a flow meter;
   generating, based on the collected sensor data and by the data logger and control panel device, an indication of grease acceptance,
      wherein generating the indication comprises:
         evaluating a measure of grease acceptance based on the collected sensor data, and
         comparing the measured grease acceptance with manufacturer specified grease volume; and
   stopping, in response to the indication of grease acceptance, the injection by the operator of the grease into the valve.

2. The method of claim 1,
   wherein obtaining the operator identifier of the greasing operator comprises scanning, using a radio frequency identification (RFID) reader of the data logger and control panel device, a first RFID tag of the greasing operator, wherein obtaining the wellhead identifier of the wellhead at the wellsite comprises:
  obtaining, using a global positioning system (GPS) receiver of the data logger and control panel device, a GPS location of the wellsite; and
  retrieving, from a wellsite GPS location database and based on the GPS location of the wellsite, the wellhead identifier,
wherein obtaining the grease gun identifier of the grease gun used by the greasing operator comprises scanning, using the RFID reader of the data logger and control panel device, a second RFID tag of the grease gun, and
wherein obtaining the valve identifier of the valve of the wellhead comprises scanning, using the RFID reader of the data logger and control panel device, a third RFID tag of the valve.

3. The method of claim 2, further comprising:
connecting, by the greasing operator and via a greasing adapter, the grease gun and the valve, wherein the greasing adapter comprises the pressure sensor and the flow meter;
connecting, by the greasing operator, the data logger and control panel device to the pressure sensor and the flow meter; and
retrieving, from a grease gun database and based on the grease gun identifier of the grease gun, a known grease volume per stroke of the grease gun.

4. The method of claim 3, further comprising:
analyzing, during said injecting, the sensor data to detect a plurality of pressure spikes with respect to time;
tallying, during said injecting, the plurality of pressure spikes to generate a stroke count with respect to time; and
calculating, by multiplying the stroke count and the known grease volume per stroke of the grease gun, a total pumped grease volume with respect to time.

5. The method of claim 4, further comprising:
retrieving, from a valve database and based on the valve identifier of the valve, a manufacturer specified lubrication grease amount, and
wherein generating the indication of grease acceptance is based at least on comparing the calculated total pumped grease volume with respect to time and the manufacturer specified lubrication grease amount.

6. The method of claim 4, further comprising:
compiling, in response to stopping said injection, job data of the valve greasing operation the wellsite, wherein the job data comprises the operator identifier of the greasing operator, the wellhead identifier of the wellhead, the grease gun identifier of the grease gun, the valve identifier of the valve, the sensor data and the stroke count with respect to time; and
uploading the job data to a job database, wherein the job database comprises historical job data of a plurality of valve greasing operations performed at the plurality of wellsites.

7. The method of claim 6, further comprising:
generating, by at least combining the job database and cumulative records of valve repair and replacement throughout the field, a training data set;
training, based on the training data set, a machine learning algorithm for the greasing operation of the field; and
generating, using the machine learning algorithm, a maintenance notice to facilitate the greasing operation of the field,
wherein the maintenance notice comprises one or more of a greasing due date, a problem status of a particular valve, and an operator performance measure.

8. A data logger and control panel device for performing greasing operations on a valve at a wellsite of a hydrocarbon field, comprising:
a radio frequency identification (RFID) reader configured to:
  scan a plurality of RFID tags of a greasing operator performing a greasing operation at the wellsite to generate an operator identifier;
  scan a second RFID tag of a grease gun used by the greasing operator to generate a grease gun identifier; and
  scan a third RFID tag of a valve of a wellhead at the wellsite to generate a valve identifier,
    wherein the grease gun is connected to the valve via a greasing adapter;
a global positioning system (GPS) receiver configured to obtain a GPS location of the wellsite;
a pressure sensor connector for connecting to a pressure sensor of the greasing adapter;
a flow meter connector for connecting to a flow meter of the greasing adapter,
  wherein the pressure sensor connector and the flow meter connector are communicatively connected to the data logger and control panel device;
a computer core module configured to:
  collect, during injection of grease from the grease gun into the valve for lubrication, sensor data from the pressure sensor and the flow meter; and
  generate, based on the collected sensor data, an indication of grease acceptance; and
a display configured to display the indication of grease acceptance,
  wherein said injection of grease into the valve for lubrication is stopped in response to the indication of grease acceptance.

9. The data logger and control panel device of claim 8, the computer core module further configured to:
retrieve, from a wellsite GPS location database and based on the GPS location of the wellsite, a wellhead identifier; and
retrieve, from a grease gun database and based on the grease gun identifier of the grease gun, a known grease volume per stroke of the grease gun.

10. The data logger and control panel device of claim 9, the computer core module further configured to:
analyze, during said injecting, the sensor data to detect a plurality of pressure spikes with respect to time;
tally, during said injecting, the plurality of pressure spikes to generate a stroke count with respect to time; and
calculate, by multiplying the stroke count and the known grease volume per stroke of the grease gun, a total pumped grease volume with respect to time.

11. The data logger and control panel device of claim 10, the computer core module further configured to:
retrieve, from a valve database and based on the valve identifier of the valve, a manufacturer specified lubrication grease amount,
  wherein generating the indication of grease acceptance is based at least on comparing the calculated total pumped grease volume with respect to time and the manufacturer specified lubrication grease amount.

12. The data logger and control panel device of claim 11, the computer core module further configured to:

compile, in response to stopping said injection, job data of the valve greasing operation the wellsite, wherein the job data comprises the operator identifier of the greasing operator, the wellhead identifier of the wellhead, the grease gun identifier of the grease gun, the valve identifier of the valve, the sensor data and the stroke count with respect to time; and upload the job data to a job database, wherein the job database comprises historical job data of a plurality of valve greasing operations performed at the plurality of wellsites.

13. The data logger and control panel device of claim 12, wherein a training data set is generated, by at least combining the job database and cumulative records of valve repair and replacement throughout the field, wherein a machine learning algorithm for the greasing operation of the field is trained based on the training data set, wherein a maintenance notice is generated using the machine learning algorithm to facilitate the greasing operation of the field, and wherein the maintenance notice comprises one or more of a greasing due date, a problem status of a particular valve, and an operator performance measure.

14. A digital greasing intelligent tool (DGIT) for performing a greasing operation at a wellsite of a field, comprising:
a data logger and control panel device, comprising:
a radio frequency identification (RFID) reader configured to:
scan a first RFID tag of a greasing operator performing a greasing operation at the wellsite to generate an operator identifier;
scan a second RFID tag of a grease gun used by the greasing operator to generate a grease gun identifier;
scan a third RFID tag of a valve of a wellhead at the wellsite to generate a valve identifier;
a global positioning system (GPS) receiver configured to obtain a GPS location of the wellsite;
a pressure sensor connector for connecting to a pressure sensor of a greasing adapter;
a flow meter connector for connecting to a flow meter of the greasing adapter,
wherein the pressure sensor connector and the flow meter connector are communicatively connected to the data logger and control panel device;
a computer core module configured to:
collect, during injecting grease from the grease gun into the valve for lubrication, sensor data from the pressure sensor and the flow meter; and
generate, based on the collected sensor data, an indication of grease acceptance; and
a display configured to display the indication of grease acceptance; and
a greasing adapter adapted to connect the grease gun and the valve, the greasing adapter comprising the pressure sensor and the flow meter,
wherein said injecting grease into the valve for lubrication is stopped in response to the indication of grease acceptance.

15. The DGIT of claim 14, the computer core module further configured to:
retrieve, from a wellsite GPS location database and based on the GPS location of the wellsite, a wellhead identifier; and
retrieve, from a grease gun database and based on the grease gun identifier of the grease gun, a known grease volume per stroke of the grease gun.

16. The DGIT of claim 15, the computer core module further configured to:
analyze, during said injecting, the sensor data to detect a plurality of pressure spikes with respect to time;
tally, during said injecting, the plurality of pressure spikes to generate a stroke count with respect to time; and
calculate, by multiplying the stroke count and the known grease volume per stroke of the grease gun, a total pumped grease volume with respect to time.

17. The DGIT of claim 16, the computer core module further configured to:
retrieve, from a grease gun database and based on the grease gun identifier of the grease gun, a known grease volume per stroke of the grease gun,
retrieve, from a valve database and based on the valve identifier of the valve, a manufacturer specified lubrication grease amount,
wherein generating the indication of grease acceptance is based at least on comparing the calculated total pumped grease volume with respect to time and the manufacturer specified lubrication grease amount.

18. The DGIT of claim 16, the computer core module further configured to:
compile, in response to stopping said injection, job data of the valve greasing operation the wellsite, wherein the job data comprises the operator identifier of the greasing operator, the wellhead identifier of the wellhead, the grease gun identifier of the grease gun, the valve identifier of the valve, the sensor data and the stroke count with respect to time.

19. The DGIT of claim 18, the computer core module further configured to upload job data to a job database, wherein the job database comprises historical job data of a plurality of valve greasing operations performed at a plurality of wellsites.

20. The DGIT of claim 19,
wherein a training data set is generated, by at least combining the job database and cumulative records of valve repair and replacement throughout the field,
wherein a machine learning algorithm for the greasing operation of the field is trained based on the training data set,
wherein a maintenance notice is generated using the machine learning algorithm to facilitate the greasing operation of the field, and
wherein the maintenance notice comprises one or more of a greasing due date, a problem status of a particular valve, and an operator performance measure.

* * * * *